(12) United States Patent
Kurup et al.

(10) Patent No.: US 12,242,837 B2
(45) Date of Patent: *Mar. 4, 2025

(54) CROSS PLATFORM CONFIGURATION DOMAIN TRANSLATION

(71) Applicant: JPMORGAN CHASE BANK, N.A., New York, NY (US)

(72) Inventors: Rejith G. Kurup, Morganville, NJ (US); Rajesh Gupta, New York, NY (US); Benjamin Irizarry, New York, NY (US); Sathya Gopalreddy, Allentown, NJ (US); Lalit Kumar, West Windsor, NJ (US); Mahesh Napa, Secaucus, NJ (US); Andrew E. Jones, Dublin, OH (US); Raghavendra Reedy Muttana, Lake Hiawatha, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,250

(22) Filed: Jun. 30, 2022

(65) Prior Publication Data

US 2022/0334817 A1 Oct. 20, 2022

Related U.S. Application Data

(63) Continuation of application No. 16/945,489, filed on Jul. 31, 2020, now Pat. No. 11,392,362.

(51) Int. Cl.
  *G06F 8/61* (2018.01)
  *G06F 9/4401* (2018.01)
  *G06F 9/48* (2006.01)

(52) U.S. Cl.
  CPC .............. *G06F 8/63* (2013.01); *G06F 9/4406* (2013.01); *G06F 9/4881* (2013.01)

(58) Field of Classification Search
  CPC ......... G06F 8/63; G06F 9/4406; G06F 9/4481
  See application file for complete search history.

(56) References Cited

U.S. PATENT DOCUMENTS

| 6,189,051 B1 * | 2/2001 | Oh ............................ G06F 8/64 709/219 |
| 6,820,259 B1 * | 11/2004 | Kawamata ................ G06F 8/61 717/173 |

(Continued)

FOREIGN PATENT DOCUMENTS

| CN | 108008962 A | * | 5/2018 | ............... G06F 8/61 |
| CN | 110096299 A | * | 8/2019 | ............. G06F 8/654 |

(Continued)

OTHER PUBLICATIONS

Filepp et al., "Image Selection as a Service for Cloud Computing Environments", Dec. 2010, IEEE (Year: 2010).*

(Continued)

*Primary Examiner* — Wei Y Zhen
*Assistant Examiner* — Junchun Wu
(74) *Attorney, Agent, or Firm* — GREENBERG TRAURIG LLP

(57) ABSTRACT

Systems and methods for cross platform configuration are described herein. The platform may receive selections for software programs or operating system configurations and selections of installation settings. A blueprint file is generated to specify the software programs or operating systems that are selected. In addition, the blueprint file may specify different installation settings and configuration settings. The blueprint file is stored in a repository and may be applied to one or more target devices. When applied, a task schedule is generated, where the task schedule prioritizes installations (Continued)

specified in a blueprint file. In addition, the task schedule specifies various provider identifiers to perform the installation(s).

15 Claims, 6 Drawing Sheets

(56) References Cited

U.S. PATENT DOCUMENTS

| | | | | |
|---|---|---|---|---|
| 7,680,957 | B1* | 3/2010 | Ketterhagen | G06F 8/63 717/176 |
| 9,495,142 | B2* | 11/2016 | Koushik | G06F 8/60 |
| 11,392,362 | B2* | 7/2022 | Kurup | G06F 9/4881 |
| 2007/0150886 | A1* | 6/2007 | Shapiro | G06F 8/63 717/174 |
| 2008/0263230 | A1* | 10/2008 | Mizuno | G03G 15/5091 710/8 |
| 2009/0183148 | A1* | 7/2009 | Bagrecha | G06F 8/61 717/171 |
| 2009/0300360 | A1* | 12/2009 | Sakaguchi | G06F 8/61 713/171 |
| 2012/0331531 | A1* | 12/2012 | Demasi | G06F 8/63 726/4 |
| 2014/0325501 | A1* | 10/2014 | Hirano | G06F 8/63 717/174 |
| 2015/0186124 | A1* | 7/2015 | Hoy | G06F 21/51 717/174 |
| 2015/0186129 | A1* | 7/2015 | Apte | G06F 9/44505 717/174 |
| 2015/0339111 | A1* | 11/2015 | Kedia | G06F 9/4411 717/176 |
| 2016/0132310 | A1* | 5/2016 | Koushik | G06F 8/61 717/176 |
| 2016/0216955 | A1* | 7/2016 | Kwon | G06F 9/445 |
| 2017/0310499 | A1* | 10/2017 | Nishikawa | H04L 12/2823 |
| 2019/0342630 | A1* | 11/2019 | Li | H04L 67/55 |
| 2020/0004521 | A1* | 1/2020 | Nishikawa | G06F 9/5027 |

FOREIGN PATENT DOCUMENTS

| | | | | |
|---|---|---|---|---|
| CN | 111371589 | A * | 7/2020 | |
| KR | 20060017017 | A * | 2/2006 | G06F 8/61 |

OTHER PUBLICATIONS

Quinton et al., "Towards Multi-Cloud Configurations Using Feature Models and Ontologies", Apr. 2013, ACM (Year: 2013).*
Hollingsworth et al., "Using Content-Derived Names for Configuration Management", 1997, ACM (Year: 1997).*
Schroeter et al., "Towards Modeling a Variable Architecture for Multi-Tenant SaaS-Applications", 2012, ACM (Year: 2012).*
Weissman et al., "The Design of the Force.com Multitenant Internet Application Development Platform", 2009, ACM (Year: 2009).*
Kwok et al., "A Software as a Service with Multi-tenancy Support for an Electronic Contract Management Application", 2008, IEEE (Year: 2008).*

* cited by examiner

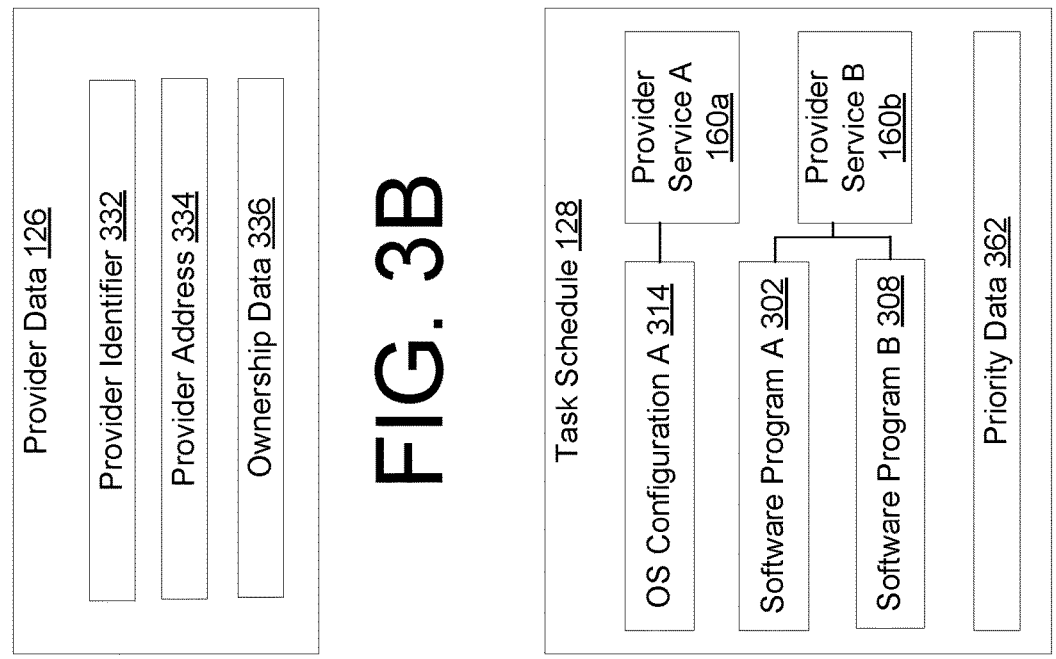
FIG. 3B
FIG. 3C
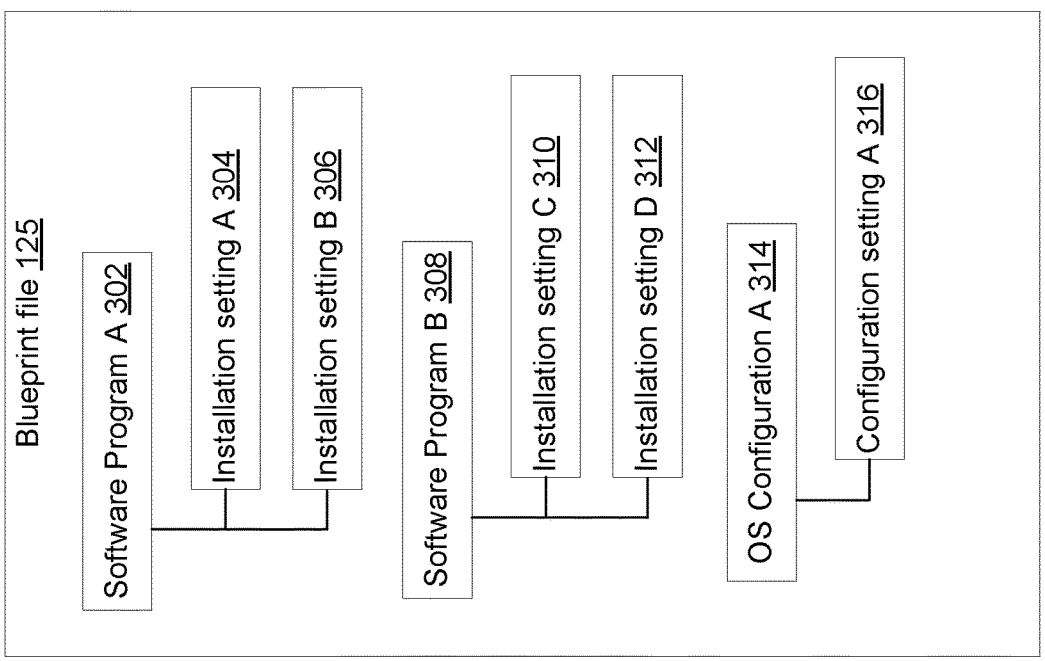
FIG. 3A

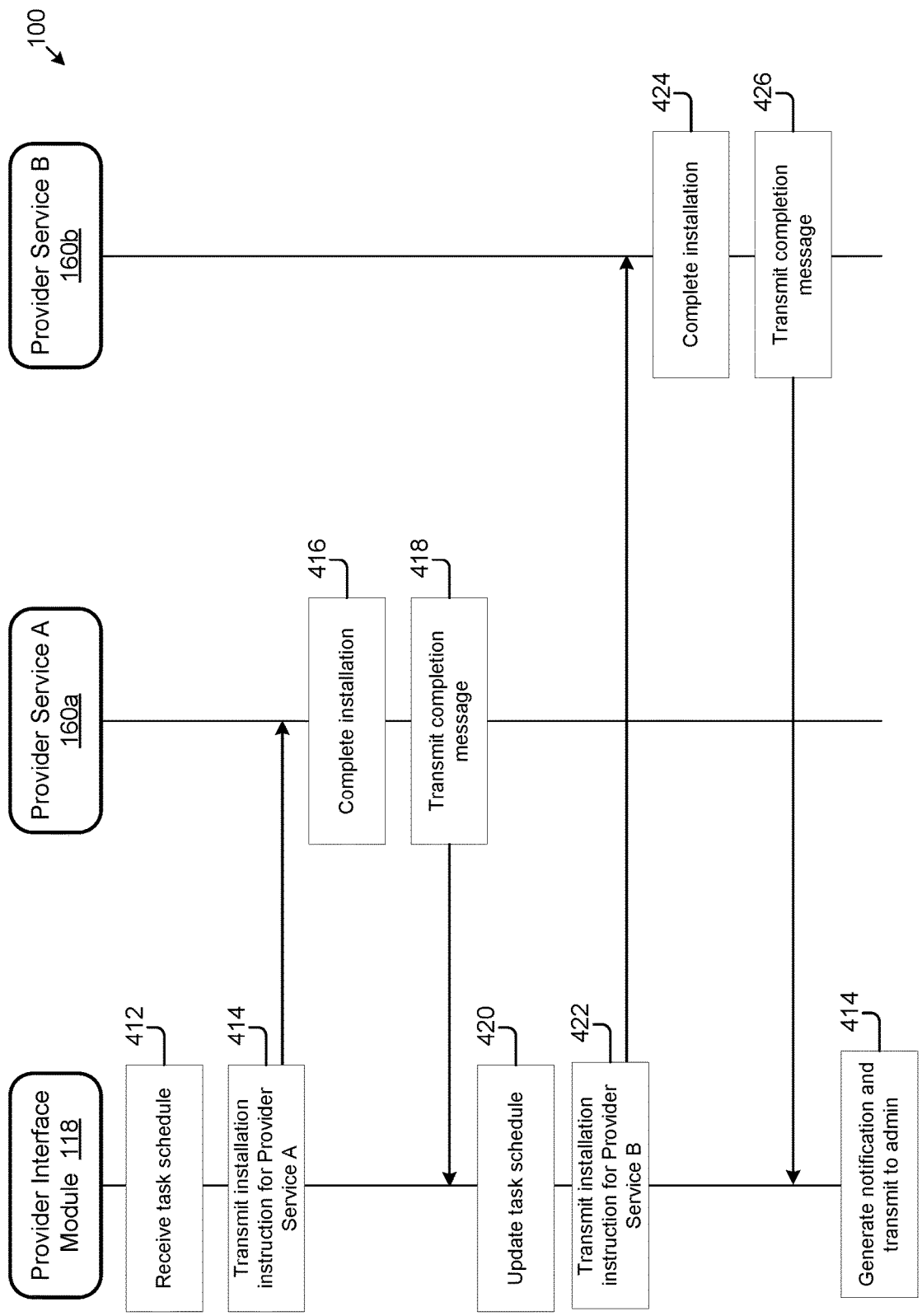

CROSS PLATFORM CONFIGURATION DOMAIN TRANSLATION

This application is a Continuation of U.S. patent application Ser. No. 16/945,489, now U.S. Pat. No. 11,392,362, filed Jul. 31, 2020, the disclosure of which is hereby incorporated, by reference, in its entirety.

BACKGROUND OF THE INVENTION

The Information Technology (IT) department of an organization is responsible for managing computing devices for its employees, customers, contractors, etc. This may involve issuing new devices and upgrading devices. In addition, the software executing on the devices may need to be installed and/or configured before or after use. Challenges arise when devices are configured to operate on different platforms or operating systems. As an organization scales, it may be increasingly difficult to service or configure the software on devices in a piecemeal process.

SUMMARY OF THE INVENTION

The present disclosure relates to a unified configuration management platform to deploy software configurations and installations in a streamlined and automated process at scale. The platform may act as a general translator for taking a series of configuration steps against a host by generating a blueprint file as a delivery component that captures the series of configurations. This may allow for a reference data design that spans a configuration management plane without restricting functionality to what one technology solution offers.

Components of the platform may include a user interface that allows administrators to select software programs and corresponding installation settings and further select operating system configurations and corresponding operating system configuration settings. The selections may be converted into a blueprint file that records how target devices should be configured. The blueprint file may be stored in a repository so that it can be reused and reapplied to different target devices. In addition, the platform may include a task scheduler that implements a blueprint by scheduling and tracking tasks with different provider services responsible for executing routines that install software and configure operating systems on target devices.

Embodiments are directed to systems and methods for a platform that receives selections for a plurality of software programs and operating system configurations. In addition, the platform may receive a selection of an installation setting for a selected software program and receive a selection of a configuration setting for a selected operating system configuration. In response, the platform may generate a blueprint file comprising references to the software programs and operating system configurations, a reference to the installation setting for the software program, and a reference to the configuration setting. The blueprint file may be stored in a repository. The platform may receive a first device identifier and a selection of the blueprint identifier. Thereafter, the platform may map each software program and operating system configuration to corresponding provider identifiers. The platform may generate a task schedule by prioritizing installations of the plurality of software programs and operating system configurations. The platform may sequentially transmit installation instructions to provider services associated with the provider identifiers according to the task schedule.

In some embodiments, the platform generates a web-based user interface to receive the selection of the plurality of software programs and operating system configurations.

In some embodiments, the platform generates the task schedule by prioritizing the installation of the plurality of software programs and operating system configurations according to a set of dependency rules.

In some embodiments, the platform receives a message from a first provider service indicating that installation of the operating system configuration is complete, and in response to the message being received, transmits an installation instruction for installing the software program to a provider service associated with a second provider identifier according to the task schedule.

In some embodiments, the blueprint file comprises a JavaScript Object Notation (JSON) file that associates the configuration setting to the operating system configuration.

In some embodiments, the platform receives a second device identifier and a subsequent selection of the blueprint identifier. The platform may retrieve the blueprint file from storage in response to the subsequent selection being received. Thereafter, the platform may generate a subsequent task schedule to install the operating system configuration on a second device associated with the second device identifier.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIGS. 3A-3C are drawings showing data that may be stored in a network environment according to various embodiments.

FIG. 4 is a timing diagram illustrating the implementation of a task schedule according to various embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Figure 1:
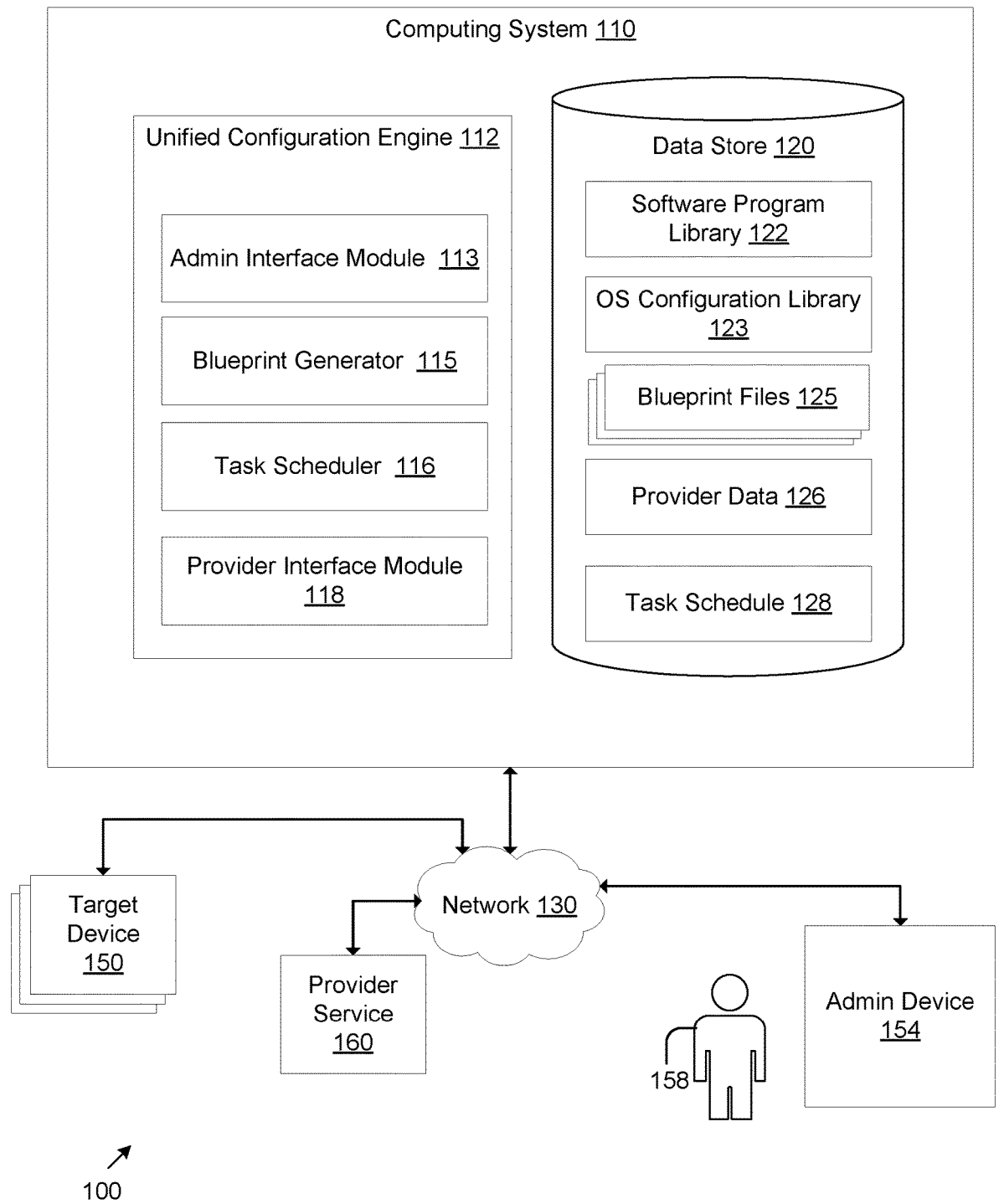
FIG. 1 is a drawing of a networked environment according to various embodiments.

FIG. 1 shows a networked environment 100 according to various embodiments. The networked environment 100 includes a computing system 110 that may execute application programs and store various data. The computing system 110 may be implemented as a server installation or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations. For example, the computing system 110 may include a plurality of computing devices that together may comprise a hosted computing resource, a grid computing resource, and/or any other distributed computing arrangement. In some embodiments, the computing system 110 may correspond to an elastic computing resource where the allotted capacity of processing, network, storage, or other computing-related resources may vary over time. The computing system 110 may implement one or more virtual machines that use the resources of the computing system 110 to execute server-side applications.

The computing system 110 may include a unified configuration engine 112. At a high-level, the unified configuration engine 112 is a platform that allows for the creation of configuration blueprints, the deployment of a blueprint to configure a set of target devices, and the tracking of software installations made by different provider services. The platform translates a series of configuration steps to generate a blueprint file as a delivery component.

The unified configuration engine 112 may include several modules. For example, the unified configuration engine 112 may include an admin interface module 113, a blueprint generator 115, a task scheduler 116, and a provider interface module 118.

The admin interface module 113 may implement a portal that allows administrators to provide selections to generate a blueprint, where the blueprint records how a target device is to be configured in terms of what software should be installed, the installation settings, Operating System (OS) configurations and OS configuration settings. The portal may be described as a marketplace that allows administrators to search for and select different configurations. The admin interface module 113 may generate web documents (e.g., Hypertext Markup Language (HTML) documents, Extensible Markup Language (XML)) and send them to client devices for rendering and displaying a user interface. To this end, the admin interface module 113 provides a web-based interface by sending documents (e.g., HTML, XML, etc.) to allow a client device to render a web-based interface using a browser or dedicated application.

The blueprint generator 115 is a module that receives various user selections and generates a blueprint file that references the user selections. The blueprint generator 115 may create data structures and objects based on user input.

The task scheduler 116 is a module that may convert a blueprint file into a task schedule. A task schedule includes a series of tasks organized for provider services which are assigned tasks. The task scheduler 116 schedules those tasks with different provider services until target devices are configured according to a specified blueprint file. The task scheduler may prioritize tasks by applying dependency rules to determine an order of installation and configuration.

The provider interface module 118 interfaces with different provider services to send and receive messages according to a task schedule. For example, the provider interface module 118 may transmit messages to inform provider services of configurations to apply and then receive messages indicating that the provider completed the task. The provider interface module 118 may generate web documents (e.g., Hypertext Markup Language (HTML) documents, Extensible Markup Language (XML)), and/or Application Programming Interface (API) function calls, and send them to provider services.

The computing system 110 may include a data store 120. The data store 120 may store data, files, executable code, libraries, application programming interfaces (APIs), and other data/executables to allow the application programs of the computing system 110 to execute. For example, the application programs of the computing system 110 may read data from the data store, write data to the data store 120, update, delete, or otherwise manipulate data in the data store 120.

The data store 120 may store a software program library 122, an OS configuration library 123, blueprint files 125, provider data 126, and one or more task schedules 128. A software program library 122 may include records reflecting a comprehensive set of software programs that may be installed in different target devices. A software program includes, for example, user-level applications, scripts, utilities, services, plugins, or other software programs that execute on an OS. The software program library 122 may catalog each software program and store corresponding metadata such as version number, license information, or other metadata. The software program library 122 may be organized by operating system type, device type, or other classifications. In addition, for each software program, the software program library 122 stores a set of installations settings. Installation settings are specific to a software program. Installation settings may refer to specific features of a software program to be installed. For example, an installation setting may be an option for a custom installation or a complete installation. An installation setting may involve activating specific plugins, specifying menu options, specifying a version of a product build, identifying connections to specific network components (e.g., databases or servers, etc.), adding contact lists, etc.

An OS configuration library 123 may include records reflecting a comprehensive set of OS configurations that may be installed in different target devices. OS configurations refer to features and aspects of how an OS is set up. An OS configuration includes, for example, background tasks to execute, device drivers, OS utilities, OS services, network settings. The OS configuration library 123 may catalog each OS configuration and store corresponding metadata. The OS configurations library 123 may be organized by operating system type, device type, or other classifications. In addition, for each OS configuration, the OS configuration library 123 stores a set of configuration settings. Configuration settings are specific to a particular OS configuration. OS configuration settings may refer to specific parameters, values, features, options or aspects of an OS configuration. For example, an OS configuration setting may be specific values for a network connection (e.g., IP address, password), virtual private network (VPN) settings, specific time zones, language settings, display settings, security settings, privacy settings, power management settings, peripheral device addresses, etc.

The blueprint files 125 may be generated by the blueprint generator 115 and stored in a repository for later use. The blueprint files 125 may comprise a JavaScript Object Notation (JSON) file that associates configuration settings to OS configurations and/or associates software programs to installation settings. The JSON file may reference each software program and/or OS configuration according to a schema. The schema may specify an identifier for the software program and/or OS configuration and a reference to each corresponding OS configuration setting or installation setting.

The provider data 126 may store information about each provider service to allow the unified configuration engine 112 to map each software program and/or OS configuration to the appropriate provider service that can handle installation and configuration.

The task schedule 128 comprises a series of tasks to implement a particular blueprint. The task schedule 128 may be generated by the task scheduler 128.

The computing system 110 is coupled to a network 130. The network 130 may include networks such as the Internet, intranets, extranets, wide area networks (WANs), local area networks (LANs), wired networks, wireless networks, or other suitable networks, etc., or any combination of two or more such networks. The computing system may communicate with a plurality of target devices 150 and admin devices 154 over the network 130. In this respect, the computing system 110 and each of the devices 150, 154 may be arranged in a client-server configuration.

Each device 150, 154 may be a personal computing device, laptop, mobile device, smart phone, tablet, desktop, or other client device. The device 150, 154 may include a client application such as a browser or dedicated mobile application to communicate with the computing system 110. The computing system 110 may receive requests from the device 150, 154 and generate responses using a communication protocol such as, for example, Hyper Text Transport Protocol (HTTP).

One type of device is the target device 150. A target device is the device that is subject to configuration using a blueprint file. A provider service 160 is responsible for configuring the OS of the target device 150 and installing software programs on the target device 150. The target device 150 may be a new, out-of-the-box, device that has default (e.g., vanilla) settings. The target device 150 may also be a pre-existing device that is being reformatted for a new user.

The provider service 160 operates as a service connector that executes software routines and tasks on the target device 150. For example, the provider service 160 may implement Configuration as Code (CAC) to configure the OS of the target device 150, install software programs on the target device 150, and/or apply any software installation settings. The provider service 160 may include a software agent that applies the configuration on the system and sends a status report to a server. The provider service 160 may operate according to a configuration language such as, for example, a declarative language. The provider service 160 may send and receive communication to/from the provider interface module 118 of the unified configuration engine 112. In some embodiments, the provider service 160 may access the target device 150 through a remote connection such as, for example, a remote desktop connection. In this respect, the target device 150 may be configured by the provider service 160.

Another type of device is the admin device 154. The admin device 154 is operated by an administrator ("admin") 158. The admin device 154 may send and receive communication from the admin interface module 113 of the unified configuration engine 112. The admin 158 may provide selections of different software programs and OS configurations to generate a blueprint file 125 using the unified configuration engine 112.

Figure 2B:
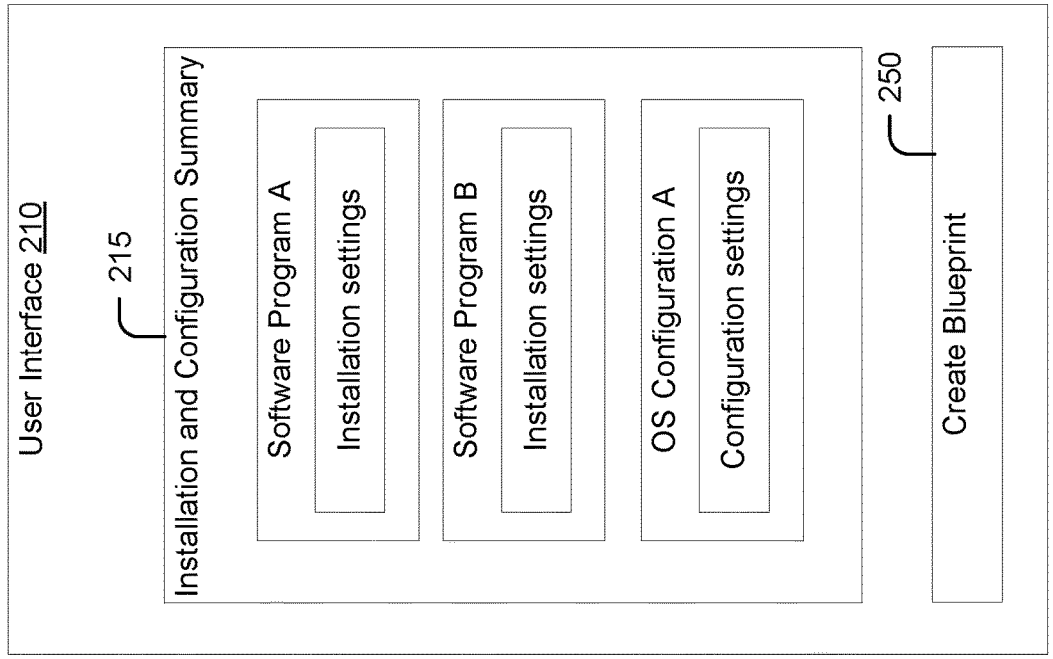
FIGS. 2A and 2B are drawings of user interfaces used to receive user selections in a networked environment according to various embodiments.
Figure 2A:
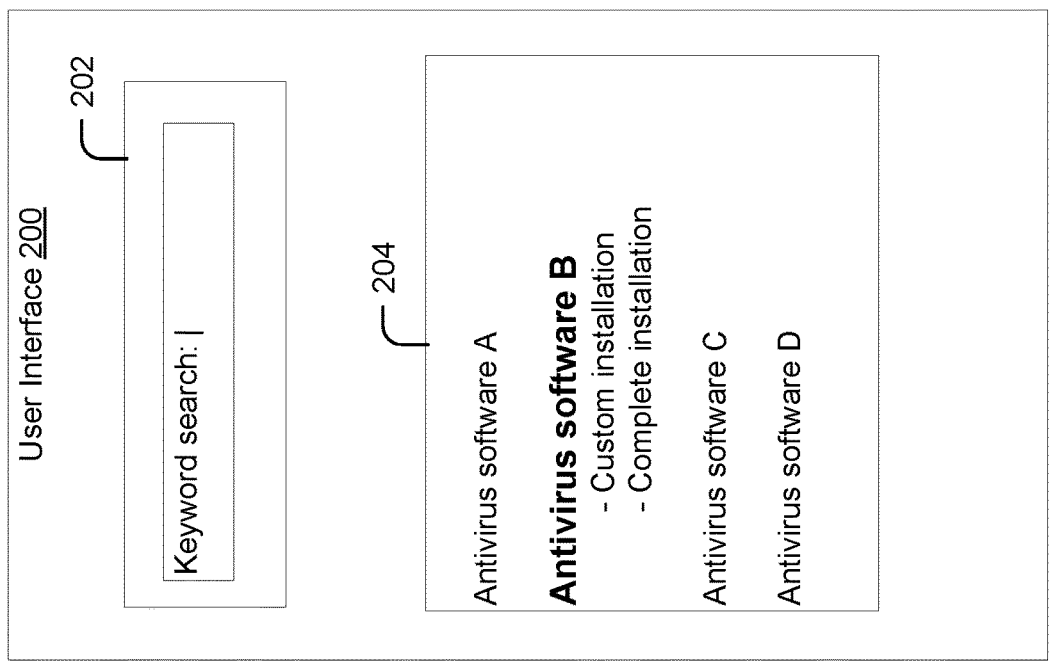

FIGS. 2A and 2B are drawings of user interfaces used to receive user selections in a networked environment according to various embodiments. The user interfaces shown in FIGS. 2A and 2B may be rendered by an admin device 154. The admin interface module 113 may generate data (e.g., web documents) to cause the user interfaces to be generated at the admin device 154.

FIG. 2A shows an example of a first user interface 200 that allows for the selection of software programs and corresponding installation settings. The first user interface 200 also allows for the selection of OS configurations and corresponding OS configuration settings. The first user interface 200 may provide a marketplace to allow admins to search for and select options to configure one or more target devices 150. The first user interface 200 may include a search interface 202. The search interface 202 may receive input such as unstructured text (e.g., keyword searches), dropdown menu selections, check box selections, or other inputs received via a web form. The search interface 202 may also include an interface element to select whether the search is for a software program, OS configuration, or other configuration.

Upon receiving search input via the search interface 202, the unified configuration engine 112 may access and search against the software program library 122 and/or OS configuration library 123. Search results may be displayed in a results field 204 of the first user interface 200. The search results field 204 displays a subset of the software programs in the software program library 122 and/or a subset of the OS configurations in the OS configuration library 123 based on the search inputs. For example, an admin who searches for antivirus software may provide search inputs (e.g., keyword search) and in response one or more software programs matching the search inputs is to be displayed in the search results field 204.

In some embodiments, each search result may be selectable by a user. In response to a selection, installation settings and/or configuration settings may be presented to the admin for further selection. For example, the FIG. 2A shows an admin who is searching for antivirus software to install on one or more target devices 150 and selects "Antivirus software B." In response, one or more installation settings may be presented for selection. The installation settings may be specific to "Antivirus software B." To this end, the admin may choose options for how to install "Antivirus software B." The software program library 122 may store software programs along with corresponding installation settings that are used when generating the first user interface 200.

FIG. 2B shows an example of a second user interface 210 that includes a summary section 210 that presents the selected software programs and/or OS configurations and corresponding installation settings and/or configuration settings. The second user interface 210 also allows for the selection of OS configurations and corresponding OS configuration settings. The summary section 210 shows a comprehensive list of selections for installing software and configuring the OS of target device(s) 150. The example in FIG. 2B shows how an admin has selected "Software Program A," "Software Program B," and "OS Configuration A." In addition, the display summary 215 may also present the selections for different installation settings and OS configuration settings corresponding to each selected software program and OS configuration.

After all selections have been made, the admin may select a user interface element 250 to generate a blueprint file 125. The blueprint file 125 generated in the example of FIG. 2B will reference "Software Program A," "Software Program B," and "OS Configuration A" along with their corresponding settings. The blueprint file 125 may then be stored in a repository (e.g., a data store 120) for subsequent and repeated use. For example, additional user interfaces may allow a user to select a particular blueprint file and target device identifiers to apply the blueprint to the specified target devices 150.

FIGS. 3A-3C are drawings showing data that may be stored in a network environment according to various embodiments. FIG. 3A shows an example of information contained in a blueprint file 125. For example, a blueprint file may conform to schema that defines how a selected software program and selected OS configuration are stored in the blueprint file 125. In this respect, the blueprint file references each selected software program and selected OS configuration. In addition, the schema may define how installation settings and configuration settings are identified, referenced, and associated with corresponding software programs and OS configurations.

The blueprint file 125 in the example of FIG. 3A references a first software program 302 and installation settings 304, 306 associated with the first software program. In addition, the blueprint file 125 also references a second software program 308 and installation settings 310, 312 associated with the second software program 308. The blueprint file 125 further references a first OS configuration 314 and a configuration setting 316 associated with the first OS configuration 314.

The blueprint file 125 allows an admin to create specific installation and configuration settings that are independent of the target device. The blueprint file 125 may be applied to several target devices 150 at a time. Blueprint files 125 may be loaded, updated and modified over time to allow an admin to control the deployment of software and OS configurations across the organization.

FIG. 3B shows an example of provider data 126. Provider data 126 contains information about each provider service 160 to allow the routing of installation tasks to the appropriate provider service 160. For example, provider data 126 includes a provider identifier 332 for addressing each provider service 160. The provider identifier 332 may include a name or other identifier that represents a provider service 160. The provider data 126 may also include a provider address 334. The provider address may be a destination address to direct communication to a provider service 160. The provider identifier 332 may be the same as the provider address, in some embodiments. Provider data 126 also includes ownership data 336. Ownership data 336 cross references items in the software program library 122 and OS configuration library 123 to a corresponding provider identifier 332. In this respect, the ownership data 336 indicates which provider service 160 is responsible for installing what software program or OS configuration.

FIG. 3C shows an example of information contained in a task schedule 128. The task schedule 128 is a schedule for the installation of tasks that are prioritized in a particular order to allow multiple provider services 160 to install and configure the OS of a target device 150. The task schedule 128 may be generated using a blueprint file 125 and provider data 126. The example of FIG. 3C shows a task schedule 128 generated by applying the blueprint file 125 of FIG. 3A to the provider data 126 of FIG. 3B. For example, the task schedule 128 shown in FIG. 3C assigns the task of configuring a target device 150 using the first OS configuration 314 to Provider Service A 160a. In addition, the task schedule 128 assigns the task of installing the first software program 302 and the second software program 308 on the target device 150 to Provider Service B 160b.

The task schedule 128 also includes priority data 362. Priority data 362 prioritizes each installation or configuration task in the task schedule 128. A task scheduler 116 that generates the task schedule 128 may use dependency rules.

For example, a dependency rule may prioritize OS configurations to be installed before installing software programs. A dependency rule may prioritize software programs that are background services to be installed before user-level applications. The priority data 362 allows for dependency management to streamline the configuration of a target device 150 when multiple provider services 160 are responsible for completing the configuration.

FIG. 4 is a timing diagram illustrating the implementation of a task schedule 128 according to various embodiments. FIG. 4 depicts embodiments of the functionality included in a unified configuration engine 112. Specifically, FIG. 4 shows a task schedule 128 that is received by a provider interface module 118 to generate, send, and receive various messages according to the task schedule 128. FIG. 4 shows communication between the provider interface module 118, a first provider service 160, and a second provider service 160b.

At item 412, a task schedule 128 is received and processed by the provider interface module 118. The provider interface module 118 may parse the task schedule 128 to identify a prioritized list of tasks organized by provider identifier 332. The provider interface module 118 identifies the initial provider service indicated by priority data 362 and generates an installation instruction. The installation instruction may include the provider identifier 332 of the first provider service 160a. The installation instruction may also identify the software program(s) and/or OS configurations that the first provider service 160a is responsible for installing. This may identify any installation settings and or configuration settings. In addition, the installation instruction may also include target device identifiers to indicate which target devices 150 are subject to configuration. A device identifier may be a serial number or other identifier that uniquely identifies a device.

At 414, the provider interface module 118 transmits the installation instruction to the first provider service 160a. At item 416, the provider service 160a may receive the installation instruction. The provider service 160a may perform the tasks identified by the installation instruction. Upon completion, the first provider service 160a transmits a completion message to the provider interface module 118 at item 418.

At item 420, the provider interface module 118 receives the completion message and updates the task schedule 128. The task schedule 128 reflects that the tasks performed by the first provider service 160a are complete. The provider interface module 118 identifies the next provider service according to the task schedule 128. In this example, the second provider service 160b is next. The provider interface module 118 generates an installation instruction indicating the software programs and/or OS configurations to be installed by the second provider service 160b.

At item 422, the provider interface module 118 transmits the installation instruction to the second provider service 160b.

At item 424, the provider service 160b receives the installation instruction. The second provider service 160b then completes the tasks according to the installation instruction. At item 426, the second provider service 160b transmits a completion message to the provider interface module 118. The provider interface module 118 receives the completion message.

The provider interface module 118 updates the task schedule 128. When all tasks in the task schedule 128 are complete, the provider interface module 118 generates a notification indicating that the target device(s) are completely configured with all software programs installed as defined by the blueprint file 125. The notification may be transmitted to the admin who requested the configuration.

Figure 5:
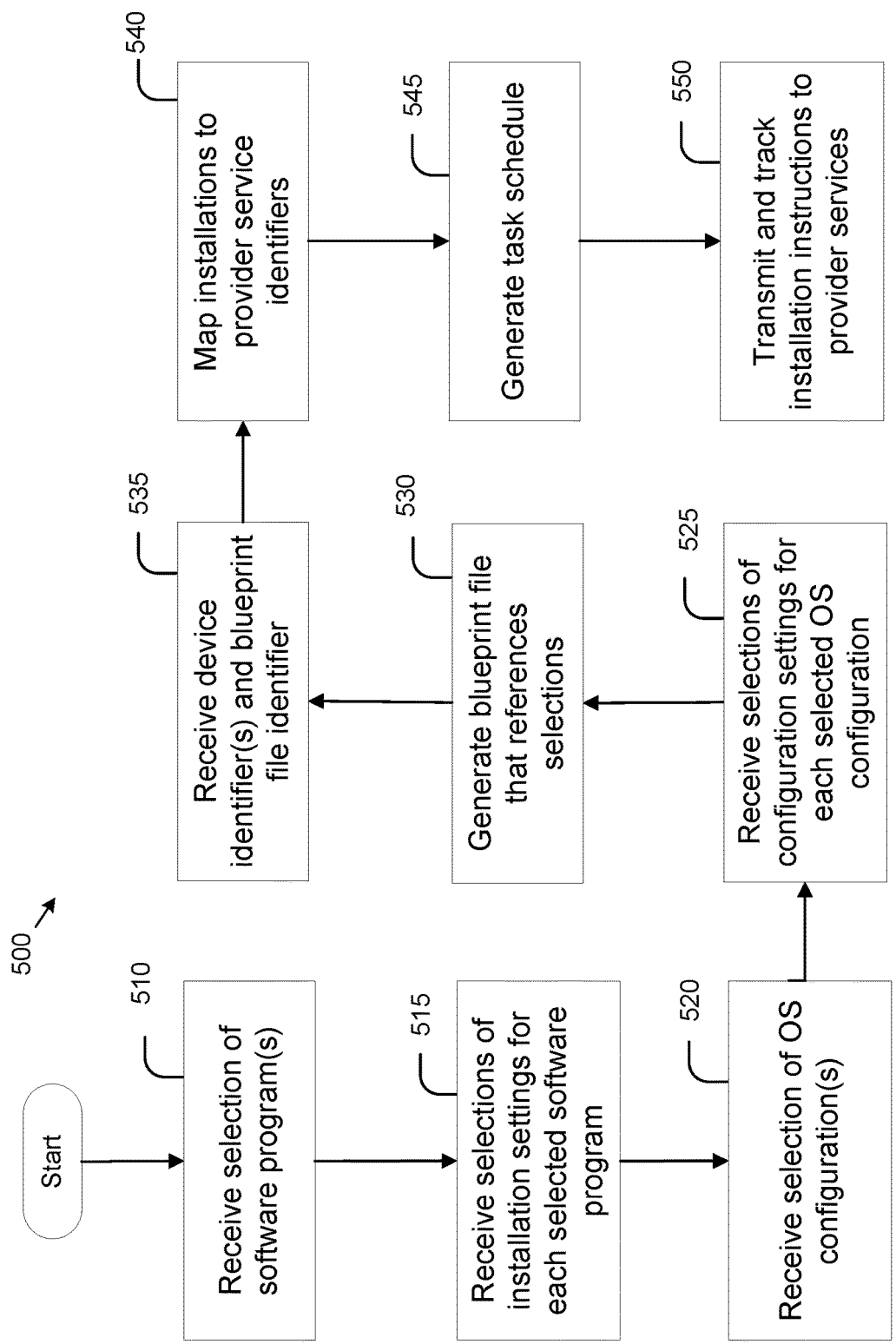
FIG. 5 is a flowchart illustrating an example of the functionality of a unified configuration engine according to various embodiments.

FIG. 5 is a flowchart illustrating an example of the functionality of unified configuration engine according to various embodiments. It is understood that the flowchart of FIG. 5 provides an illustrative example of the many different types of functional arrangements that may be employed to implement the operation of the portion of a computing system as described herein. The flowchart of FIG. 5 may also be viewed as depicting an example of a method 500 implemented in the networked environment 100 of FIG. 1 according to one or more embodiments. FIG. 5 may represent the functionality of a unified configuration engine, such as, for example, the unified configuration engine 112 of FIG. 1.

At item 510, the computing system receives a selection of software program(s). The computing system may generate a web-based user interface to receive the selection of software programs. The web-based user interface may be rendered at an admin device that acts as a client device. The web-based user interface may display the names or identifiers of different software programs. For example, the software programs may be cataloged a software program library in a data store.

At item 515, the computing system may receive selections of installation settings for each selected software program. Different installation settings may be associated or otherwise linked to a corresponding software program. For example, a software program library may contain data structures that link a particular software program with corresponding installation settings. The installation settings may be stored as a hierarchical tree structure for a particular software program. The selections of installation settings may be provided via a web-based user interface.

At item 520, the computing system receives a selection of OS configuration(s). The computing system may generate a web-based user interface to receive the selection of OS configurations. The web-based user interface may be rendered at an admin device that acts as a client device. The web-based user interface may display the names or identifiers of different OS configurations. For example, the OS configurations may be cataloged an OS configuration library in a data store.

At item 525, the computing system may receive selections of configuration settings for each selected OS configuration. Different configuration settings may be associated or otherwise linked to a corresponding OS configuration. For example, an OS configuration library may contain data structures that link a particular OS configuration with corresponding configuration settings. The configuration settings may be stored as a hierarchical tree structure for particular OS configuration. The selections of configuration settings may be provided via a web-based user interface.

At item 530 the computing system may generate a blueprint file that references selections. For example, the computing system may generate a JavaScript Object Notation (JSON) file that associates installation settings and/or configuration settings to corresponding OS configurations and/or software programs. The blueprint file may be stored in a repository and accessed using a blueprint identifier.

At item 535, the computing system may receive device identifier(s) and a blueprint file identifier. For example, an admin who intends to configure a set of target devices using a particular blueprint may specify device identifiers (e.g., serial numbers) of each target device along with the blueprint identifier. The user may specify these inputs using a web-based user interface.

At item 540, the computing system may map installations to provider identifiers. For example, the computing system may access provider data to determine the provider identifier associated or linked with each software program and/or OS configuration. The computing system performs a database query to determine the provider identifiers using an identifier for the software program or OS configuration as an input parameter. The computing system generates a list of provider identifiers associated with the provider services responsible for installing each software program or OS configuration referenced in the blueprint file.

At item 545, the computing system generates a task schedule. The computing system may prioritize the installation of each software program and/or operating system configuration referenced in a blueprint file using one or more dependency rules. For example, a dependency rule may prioritize installing OS configurations before installing software programs. The task schedule may also specify an installation order for each provider identifier.

At item 550 the computing system may transmit and track installation instructions to provider services according to the task schedule. An example of these operations is discussed in FIG. 4.

The same blueprint file may later be applied to new target devices to support scalability. Additional target devices may be specified using device identifiers and the same blueprint file may also be specified by an admin to create a new task schedule. Blueprint files may be loaded and updated over time as the admin desires to make changes to blueprint file.

Figure 6:
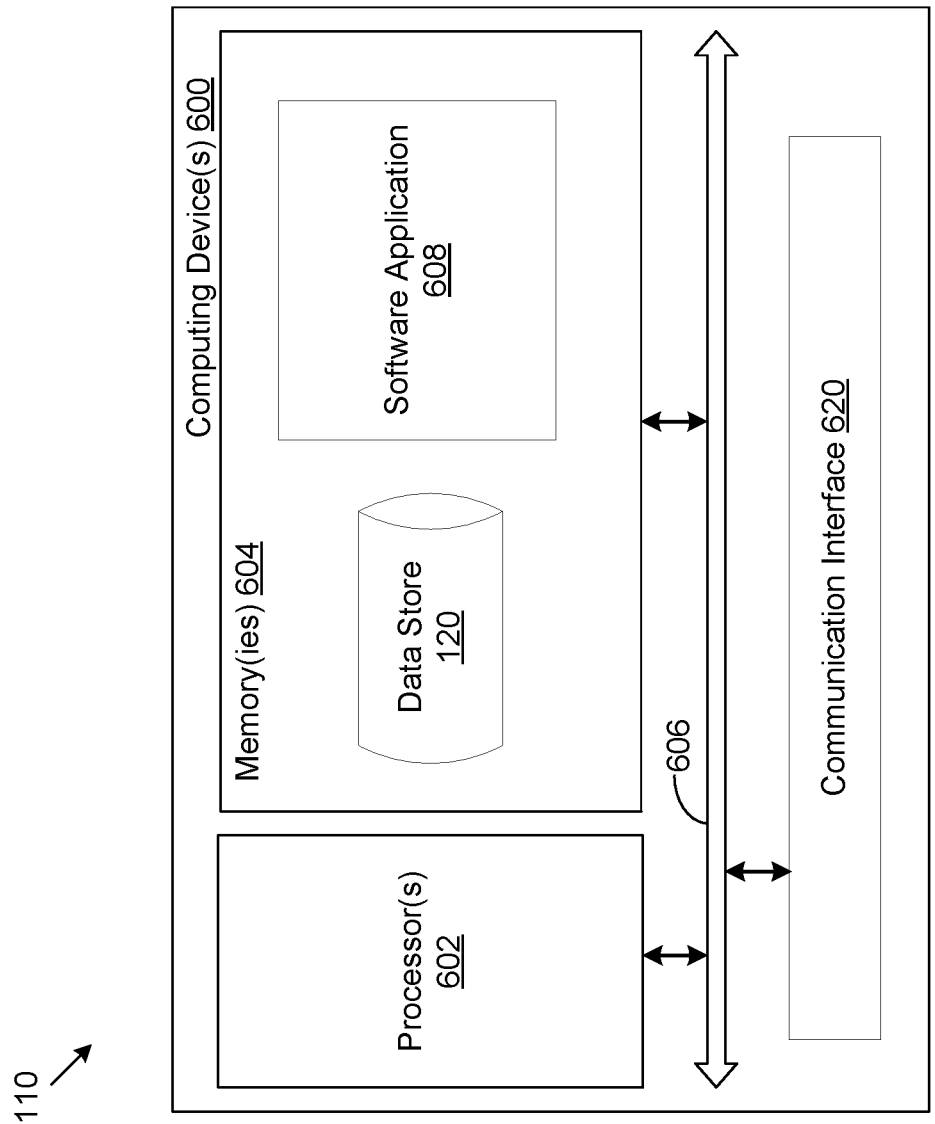
FIG. 6 is a schematic showing an example of an implementation of various embodiments in a computing system.

FIG. 6 is a schematic showing an example of an implementation of various embodiments in a computing system 110. The computing system 110 may include one or more computing devices 600 with distributed hardware and software to implement the functionality of the computing system 110.

The computing device 600 includes at least one processor circuit, for example, having a processor 602 and memory 604, both of which are coupled to a local interface 606 or bus. Stored in the memory 604 are both data and several components that are executable by the processor 602. For example, the memory 604 may include the data store 120 as well as other memory components that store data or executables.

Also stored in the memory 604 and executable by the processor 602 is a software application 608. The software application 608 may embody the functionality described in FIGS. 4 and 5. The software application 608 may include one or more modules of the unified configuration engine 112 of FIG. 1.

It is understood that there may be other applications that are stored in the memory 604 and are executable by the processor 602 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 604 and are executable by the processor 602. In this respect, the term "executable" means a program file that is in a form that can ultimately be run by the processor 602. Examples of executable programs may be, for example, a compiled program that can be translated into machine code in a format that can be loaded into a random access portion of the memory 604 and run by the processor 602, source code that may be expressed in proper format such as object code that is capable of being loaded into a random access portion of the memory 604 and executed by the processor 602, or source code that may be interpreted by another executable program to generate instructions in a random access portion of the memory 604 to be executed by the processor 602, etc.

An executable program may be stored in any portion or component of the memory 604 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 is defined herein as including both volatile and nonvolatile memory and data storage components. Volatile components are those that do not retain data values upon loss of power. Nonvolatile components are those that retain data upon a loss of power. Thus, the memory 604 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RANI may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 602 may represent multiple processors 602 and/or multiple processor cores and the memory 604 may represent multiple memories 604 that operate in parallel processing circuits, respectively. In such a case, the local interface 606 may be an appropriate network that facilitates communication between any two of the multiple processors 602, between any processor 602 and any of the memories 604, or between any two of the memories 604, etc. The local interface 606 may couple to additional systems such as the communication interface 620 to coordinate communication with remote systems.

Although components described herein may be embodied in software or code executed by hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart discussed above show the functionality and operation of an implementation of components within a system such as a software application 608 or other software. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 602 in a computer system or other system. The machine code may be converted from the source code, etc. If embodied in hardware, each block may represent a circuit or a number of interconnected circuits to implement the specified logical function(s).

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart may also comprise software or code that can be embodied in any non-transitory computer-readable medium for use by or in connection with an instruction execution system such as, for example, a processor 602 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any program or application described herein, including the software application 608, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer-implemented method comprising:
presenting, in a web-based user interface, a plurality of software programs that are available for installation to a target electronic device;
receiving a selection of a first software program of the plurality of software programs, wherein a set of installation settings are stored in association with the first software program;
receiving a selection of an installation setting for the selected first software program;
receiving a selection of an operating system configuration for installation of an operating system on the target device;
receiving a selection of an installation setting for the selected operating system configuration;
generating a blueprint file comprising a reference to the first software program and a reference to the installation setting for the selected first software program, and a reference to the installation setting for the selected operating system configuration, the blueprint file comprising a blueprint identifier;
receiving a first device identifier associated with the target device and a selection of the blueprint identifier;
mapping the first software program to a first provider identifier associated with a first provider service, wherein the target device and the first provider service are connected via a communication network;
generating a task schedule by prioritizing an installation of the first software program and the operating system based on one or more dependency rules; and
transmitting, according to the task schedule, an installation instruction for installing the first software program to the first provider service associated with the first provider identifier, wherein the installation instruction identifies the first software program and comprises the selected installation setting.

2. The method of claim 1, further comprising generating a web-based user interface to receive the selection of the first software program, receive the selection of the installation setting, and receive the first device identifier.

3. The method of claim 1, further comprising: receiving a selection of a second software program, wherein the blueprint file comprises a reference to the second software program.

4. The method of claim 3, further comprising generating the task schedule by prioritizing the installation of the first software program with respect to the second software program according to a second dependency rule.

5. The method of claim 1, wherein generating the blueprint file comprises generating a JavaScript Object Notation (JSON) file that associates the installation setting to the first software program.

6. The method of claim 1, further comprising:
receiving a second device identifier and a subsequent selection of the blueprint identifier;
retrieving the blueprint file from storage in response to receiving the subsequent selection; and
generating a subsequent task schedule to install the first software program on a second device associated with the second device identifier.

7. A computer-implemented method, the method comprising:
presenting, in a web-based user interface, a plurality of software programs that are available for installation to a target electronic device;
receiving a selection of a first software program of the plurality of software programs, wherein a set of installation settings are stored in association with the first software program;
receiving a selection of an operating system configuration, wherein a set of configuration settings are stored in association with the operating system configuration;
receiving a selection of a configuration setting of the selected operating system configuration;
generating a blueprint file comprising a reference to the selected first software program, and a reference to the operating system configuration and a reference to the configuration setting, the blueprint file comprising a blueprint identifier;
receiving a first device identifier associated with a target device and a selection of the blueprint identifier;
mapping the operating system configuration to a first provider identifier associated with a first provider service, wherein the target device and the first provider service are connected via a communication network;
generating a task schedule by prioritizing an installation of the operating system configuration and the operating system based on one or more dependency rules; and
transmitting, according to the task schedule, an installation instruction for installing the operating system configuration to the first provider service associated with the first provider identifier, wherein the installation instruction identifies the operating system and comprises the selected operating system configuration.

8. The method of claim 7, further comprising generating a web-based user interface to receive the selection of the operating system configuration, receive the selection of the configuration setting, and receive the first device identifier.

9. The method of claim 7, wherein generating the blueprint file comprises generating a JavaScript Object Notation (JSON) file that associates the configuration setting to the operating system configuration.

10. The method of claim 7, further comprising:
receiving a second device identifier and a subsequent selection of the blueprint identifier;
retrieving the blueprint file from storage in response to receiving the subsequent selection; and
generating a subsequent task schedule to install the operating system configuration on a second device associated with the second device identifier.

11. A system, comprising:
a computer processor; and
a memory that stores a plurality of instructions, which, when executed by the computer processor, cause the computer processor to:
present, in a web-based user interface, a plurality of software programs that are available for installation to a target electronic device;
receive selections for a subset of the plurality of software programs and operating system configurations;

receive a selection of an installation setting for the subset of software programs and receive a selection of a configuration setting for a selected operating system configuration;

generate a blueprint file comprising a blueprint identifier and references to the subset of software programs and operating system configurations, a reference to the installation setting for the subset of software programs, and a reference to the selected configuration setting;

receive a first device identifier associated with a target device and a selection of the blueprint identifier;

map each of the subset of software programs and operating system configuration to corresponding provider identifiers, wherein each provider identifier is associated with a respective provider service and is connected to the target device via a communications network;

generate a task schedule by prioritizing installations of the subset of software programs and operating system configurations; and sequentially transmit, according to the task schedule, installation instructions to the respective provider services associated with the corresponding provider identifiers, wherein the installation instructions identifies the subset of software programs and comprises the selected installation setting.

12. The system of claim 11, wherein the plurality of instructions, which, when executed by the computer processor, cause the computer processor to:
generate a web-based user interface to receive the subset of software programs and operating system configurations.

13. The system of claim 11, wherein the plurality of instructions, which, when executed by the computer processor, further cause the computer processor to:
generate the task schedule by prioritizing the installation of the subset of software programs and operating system configurations according to a set of dependency rules.

14. The system of claim 11, wherein the blueprint file comprises a JavaScript Object Notation (JSON) file that associates the configuration setting to the selected operating system configuration.

15. The system of claim 11, wherein the plurality of instructions, which, when executed by the computer processor, further cause the computer processor to:
receive a second device identifier and a subsequent selection of the blueprint identifier;
retrieve the blueprint file from storage in response to the subsequent selection being received; and
generate a subsequent task schedule to install the selected operating system configuration on a second device associated with the second device identifier.

* * * * *